United States Patent [19]

Jansen et al.

[11] Patent Number: 4,887,334
[45] Date of Patent: Dec. 19, 1989

[54] CLAMPING ASSEMBLY WITH SIDE ENTRY CONNECTION OF A CLAMP UNIT TO A BAND

[75] Inventors: George A. Jansen, Denver; Hans R. Hinnen, Lakewood, both of Colo.

[73] Assignee: Band-It-Idex, Inc., Denver, Colo.

[21] Appl. No.: 348,906

[22] Filed: May 8, 1989

Related U.S. Application Data

[63] Continuation of Ser. No. 167,006, Mar. 10, 1988, abandoned.

[51] Int. Cl.⁴ ............................................. F16L 33/08
[52] U.S. Cl. .................... 24/23 R; 24/274 R
[58] Field of Search ............... 29/434; 24/19, 20 LS, 24/274 R, 274 P, 274 WB, 279, 21, 22, 23 R, 23 B, 23 EE

[56] References Cited

U.S. PATENT DOCUMENTS

| | | | |
|---|---|---|---|
| 204,183 | 5/1878 | Arnold | 24/22 |
| 2,998,629 | 9/1961 | Smith | 24/279 |
| 3,879,811 | 4/1975 | Leverton. | |
| 3,914,832 | 10/1975 | Petrus | 24/274 R |
| 4,286,361 | 9/1981 | MacKenzie. | |
| 4,307,495 | 12/1981 | Sadler. | |
| 4,510,650 | 4/1985 | Espinoza | 24/274 R |

FOREIGN PATENT DOCUMENTS

| | | | |
|---|---|---|---|
| 1284748 | 12/1968 | Fed. Rep. of Germany | 24/274 R |
| 2552597 | 5/1977 | Fed. Rep. of Germany | 24/274 R |
| 7408399 | 12/1975 | Netherlands | 24/23 |
| 2040346 | 8/1980 | United Kingdom | 24/274 R |

*Primary Examiner*—James R. Brittain
*Attorney, Agent, or Firm*—Sheridan, Ross & McIntosh

[57] ABSTRACT

A clamping assembly is disclosed for constricting an object, such as hoses or the like. The clamping assembly includes a clamp unit and, preferably, a roll formed band. The clamp unit includes a pair of spaced, parallel shelves. A longitudinal gap is created between the two shelves for receiving portions of the band. An interior shelf of the two shelves includes locking teeth. The clamping assembly is characterized by a sidewise joining of the clamp unit and band portions. The clamping assembly also includes a worm screw for engaging other portions of the band.

6 Claims, 2 Drawing Sheets

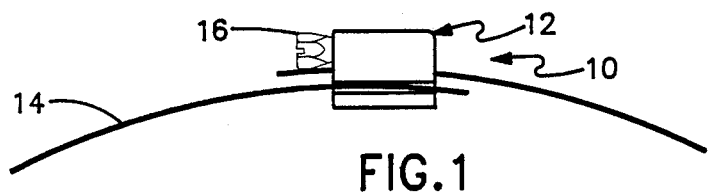
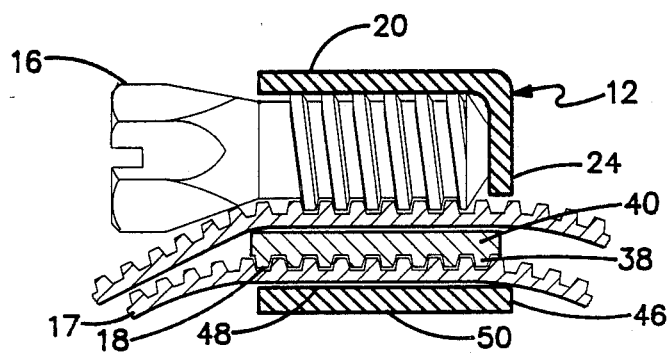
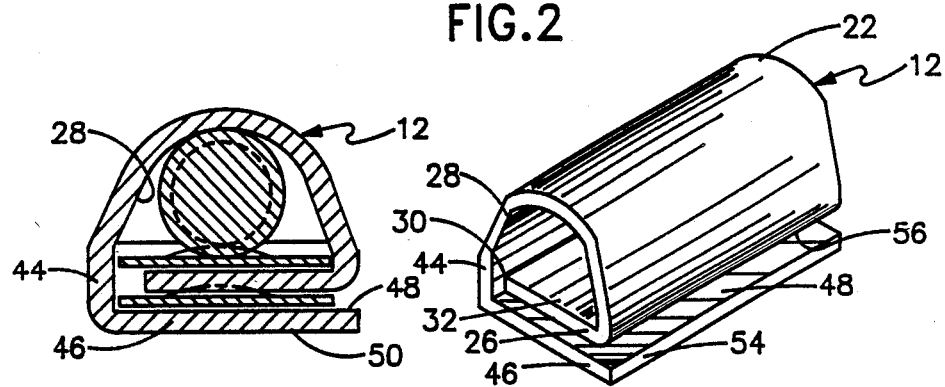
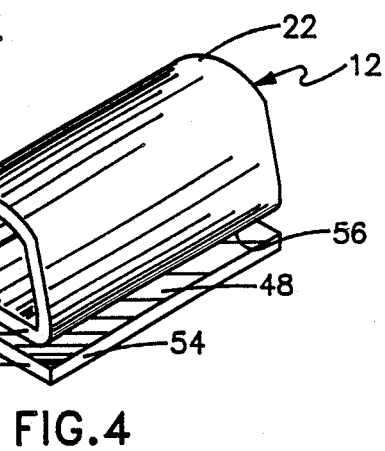
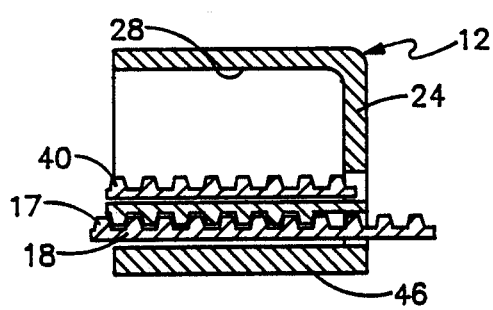
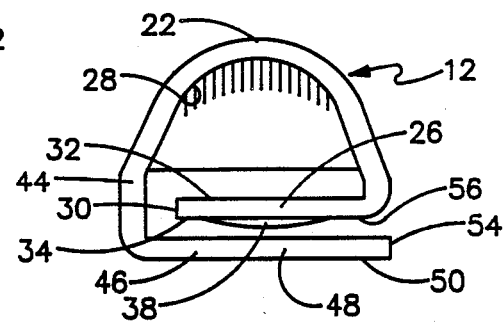

CLAMPING ASSEMBLY WITH SIDE ENTRY CONNECTION OF A CLAMP UNIT TO A BAND

This is a continuation of application Ser. No. 167,006, filed Mar. 10, 1988, now abandoned.

FIELD OF THE INVENTION

The present invention relates to the art of constricting objects using a clamp and a flexible band and, in particular, to a clamp unit which can be removed from a band and subsequently positioned on the band at a different location.

BACKGROUND OF THE INVENTION

There are a number of prior art clamping devices of different configurations and for use in achieving a variety of clamping purposes. According to one method of categorization, these devices can be classified into one of two categories. The first category is characterized by the fact that one end of the band is, by design, permanently fixed to the clamp housing. If not so attached at manufacture then it is essentially permanently attached upon initial assembly by the user of the clamping device. The second category consists of those clamping devices in which the clamp or housing thereof can be removed from the band or strap and re-positioned on the band at a different location or attachment area.

With respect to this second category of clamping devices, prior art devices are disclosed in three known prior art patents. U.S. Pat. No. 3,879,811, issued Apr. 29, 1975, to Leverton, entitled "Constrictible Band Clips" describes a band with circular holes in it and a housing with a single tooth or protuberance to engage the band at a desired or selected one of the holes. The other end of the band is bent at a right angle and is rotatably attached to the nose of an adjuster screw. Turning of the screw moves the screw through the housing and decreases the length or diameter of the band around an object, which is being constricted by the band. U.S. Pat. No. 4,286,361, issued Sept. 1, 1981, to MacKenzie, entitled "Hose Clamp" describes a band with slot holes in it and a housing with protuberances extending from its lower outer surface to engage the band at a selected first area or point. The band is engaged at a second area or point by means of a worm-drive screw. Guide arms at one end of the housing locate and position the protuberances in the holes of the band, together with the object being constrained. U.S. Pat. No. 4,307,495, issued Dec. 29, 1981, to Sadler, entitled "Hose Clamp" describes a band with slot holes in it and a housing with protuberances extending from its lower inner surface to engage the band at one point. The band is engaged at a second point by a worm-drive screw.

SUMMARY OF THE INVENTION

The clamping assembly of this invention preferably includes a flexible roll formed band which has a continuous, alternating series of depressions and ridges along its longitudinal axis. The clamping assembly also includes a clamp unit and a worm screw. The clamp unit is used to engage the band at one suitable position on the band. The worm screw is received into a chamber of the clamp unit for engaging a second suitable position.

The clamp unit includes a body having a generally semi-circular shape. The clamp unit also includes an interior shelf connected to one side of the body and an exterior shelf connected to the opposite side of the body. Because of this construction, a band receiving area or longitudinal gap is defined between the shelves into which band portions can be inserted laterally. The depressions and ridges of the band are engaged by locking teeth extending out from the interior shelf. These teeth prevent movement of the band in longitudinal direction. Also because of the teeth construction and arrangement, the band cannot be inserted into the clamping unit in a longitudinal direction. The second location on the band is engaged by the worm screw and band portions are held firmly against an outer surface of the interior shelf.

In use, in one embodiment, one end of the band is inserted into the clamp unit in a direction along the longitudinal extent of the band. The screw is then positioned into the clamp unit. Next, the band is placed around the object to be confined. Portions of the band are then slid sideways into the clamp unit using the longitudinal receiving area so that the band closely confines the object. The screw can be used to further tighten the band around the object, if needed or desired.

BRIEF DESCRIPTION OF THE DRAWINGS

FIG. 1 is a side elevational view showing the various parts of the clamping assembly of the present invention joined together;

FIG. 2 is a longitudinal, cross-sectional view illustrating the engagement between the worm screw and band portions, as well as the engagement of the locking teeth and other band portions;

FIG. 3 is a lateral, cross-sectional view illustrating the assembled parts of the clamping assembly including the locking teeth that engage portions of the band;

FIG. 4 is a perspective view showing the clamp unit with the worm screw and band portions removed;

FIG. 5 is a cross-sectional view showing the band portions and the locking teeth with the worm screw removed;

FIG. 6 is a cross-sectional view showing the clamp unit with the worm screw and the band portions removed.

DETAILED DESCRIPTION OF THE PREFERRED EMBODIMENT

Figure 7:
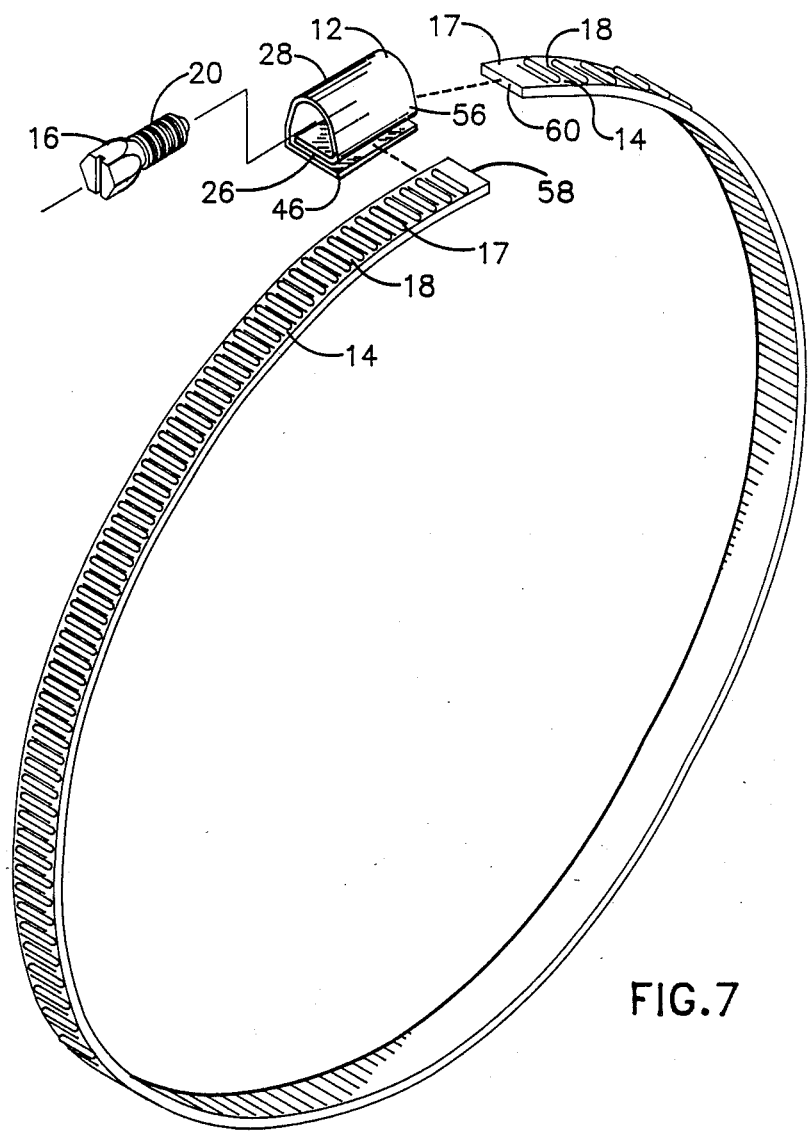
FIG. 7 is a perspective view illustrating the sidewise connecting of the clamp unit and band portions.

In accordance with the present invention, a clamping assembly 10 is disclosed for use in tightening objects, such as hoses and the like. With reference to FIG. 1, the clamping assembly 10 includes a clamp unit or housing 12 that receives portions of a band or strap 14. The band 14 is positioned about the object to be clamped or tightened. The clamp assembly 10 also includes a worm screw 16, which is positioned and held in the clamp unit 12 for use in adjusting the tension of the band 14 by movement thereof relative to the clamp unit 12 by turning or rotating the worm screw 16.

The band 14 is, preferably, a roll formed band. With reference to FIGS. 2-4, the roll formed band 14 includes a number of alternately spaced ridges 17 and depressions 18. The depressions 18 define recesses for receiving threads 20 of the worm screw 16, but are not so deep as to constitute through holes in the band 14.

The important and novel features of the present invention reside in the clamp unit 12, as best illustrated in FIGS. 4 and 6, which show the clamp unit 12 without the roll formed band 14 and the worm screw 16. The clamp unit 12 includes a main body 22, which is shaped somewhat in the form of a semi-circle. One end of the body 22 is open for inserting the screw 16 while the opposite end has a stop wall or cover 24 against which is positioned the tip of the screw 16, as best seen in FIG. 2 The clamp unit 12 also includes an interior shelf 26 having a portion or side integrally formed with the body 24. The body 22 and the interior shelf 26 define a chamber 28 for receiving the threads 20 of the worm screw 16 and portions of the band 14. The interior shelf 26 extends inwardly of the body 22 to define the chamber 28 and terminates to define a free end or edge 30 of the interior shelf 26. The interior shelf 26 also includes a first or upper surface 32 and a second or lower surface 34. The upper surface 32 faces the chamber 28 and the lower surface 34 has a number of teeth or projections 38 that extend outwardly from the lower surface 34. The teeth 38 are spaced from each other to define recesses 40, as seen in FIGS. 2 and 5. The recesses 40 are of a size to receive ridges 17 of the roll formed band 14 for use in providing a locking engagement between the clamp unit 12 and the roll formed band 14.

The clamp unit 12 also includes a leg 44 connected to that side of the body 22 opposite from the side integrally joined to the interior shelf 26. The leg 44 extends a short distance and is integrally joined to an exterior shelf 46. As can be seen in FIG. 6, the free edge 30 of the interior shelf 26 and the leg create a longitudinal gap having a relatively small width. The exterior shelf 46, like the interior shelf 26, has a first or inner surface 48 and a second or outer surface 50. The inner surface 48 faces the locking teeth 38 and provides a support for portions of the band 14. The inner surface 48 has a substantially relatively smooth face. The outer surface 50 also has a substantially relatively smooth face and is that part of the clamp unit 12 that contacts portions of the object to be held or clamped by the clamping assembly 10. The exterior shelf 46 is an integral solid or continuous member that has a longitudinal extent essentially the same as that of the interior shelf 26. The lateral extent or width of the exterior shelf 46 is greater than that of the interior shelf 26. The exterior shelf 46 also has a free edge 54, which is located near or below that edge of the interior shelf 26, which is integrally joined to the body 22. This construction defines a longitudinally-extending gap or receiving area 56 for use in receiving a selected or desired portion of the roll formed band 14. Unlike known clamping assemblies, the clamp unit 12 and band 14 of the present invention are combined or joined together by using a sidewise movement of one or both of the clamp unit 12 and the band 14, as will next be explained.

In using the clamping assembly 10, a desired length of the roll formed band 14 is selected and typically cut or disconnected from a larger roll of the band 14. With reference to FIG. 7, a desired or selected band portion or attachment area on the band 14, which is spaced from first and second free ends 58, 60 of the band 14, is taken and inserted into the longitudinally extending receiving area 56 in a sidewise manner. The clamp unit 12 is joined to this portion of the band 14 by moving the clamp unit 12 substantially perpendicular to the longitudinal extent of the band 14. In this manner, the locking teeth 38 are caused to engage the depressions 18 of this part of the band 14. The teeth 38 are configured to function with the ridges 17 and the depressions 18 of the band 14 such that the teeth 38 will not accept the band in a direction along the longitudinal extent of the band 14. That is, the user is unable to position the free ends 58, 60 of the band 14 between the interior and exterior shelves 26, 46, respectively, in a direction along the longitudinal extent of the band 14. After the clamp unit 12 and the band 14 are joined together, the next step is to position the band 14 about the object to be constrained. After being positioned about the desired object, the free end 60 of the band 14 is inserted into that end of the clamp unit 12 having the stop wall 24 so that the free end 60 is supported on the first or upper surface 32 of the interior shelf 26 and with the ridges 17 and the depressions 18 of the band 14 facing the chamber 28. The user pushes or causes a portion or length of the band 14 through the clamp unit 12 so that the band 14 is more closely in contact or adjacent to the object. The threaded portion 20 of the worm screw 16 is then inserted into the chamber 28 whereby the threaded portion 20 overlies portions of the roll formed band 14 and the threads 20 are received by the depressions 18 of the band portion supported on the upper surface 32 of the interior shelf 26. The worm screw 16, which has its tip or end abutted against the stop wall 24 can then be turned to cause the band 14 to move relative to the clamp unit 12 and thereby further tighten the band 14 about the object.

Based on the foregoing detailed description, a number of advantages of the present invention are readily seen. A clamping assembly is provided that can be easily adapted to clamp different sized or diameter objects since the clamp unit is detachable from the band. The clamp unit and the band are readily attached using a novel sidewise engagement whereby locking teeth of the clamp unit engage depressions of a roll formed band. A worm screw received by the clamp unit provides the fine adjustment or tightening of the band about the object. The clamp unit is an integral piece that can be inexpensively manufactured and yet provides the necessary strength and locking capability to reliably clamp hoses or other objects.

Although the present invention has been described with reference to a particular embodiment, it should be appreciated that variations and modifications can be effected within the spirit and scope of this invention.

What is claimed is:

1. A clamping assembly, comprising:

band means having a longitudinal extent and a lateral extent and having first and second ends, said band means being adapted to be clamped about an object;

clamping means joined to said band means for use in holding said band means about the object, said clamping means and said band means being joined together by a sidewise movement of at least one of said band means and said clamping means, said clamping means including:
a body having a length and a width,
a leg integral with said body,
an interior shelf having a lateral extension and a first surface and a second surface, said interior shelf also having one of a shelf portion and a side operatively formed to said body, and,
an exterior shelf having one of a shelf portion and a side operatively formed to said body, said exterior shelf having a width equal to or greater than said lateral extent of said band means whereby said exterior shelf provides a barrier between said band means and the object being clamped; and wherein said body, said exterior shelf and said interior shelf are integrally formed from a single piece of material and each of said interior shelf and exterior shelf has a free edge with said free edge of said interior shelf being located adjacent to an inner surface of at least one of said body and said leg at the end of said lateral extension of said interior shelf and said interior shelf free edge being spaced both vertically and horizontally from said free edge of said exterior shelf.

2. A clamping assembly, comprising:

band means having a longitudinal extent and a lateral extent and adapted to be clamped about an object; and clamping means joined to said band means for use in holding said band means about the object, said clamping means including:
a body having a length and a width,
a leg integral with said body,
an interior shelf having a lateral extension and a first surface and a second surface, said interior shelf also having one of a shelf portion and a side operatively formed to said body, and,
an exterior shelf having one of a shelf portion and a side operatively formed to said body, said exterior shelf having a width equal to or greater than said lateral extent of said band means whereby said exterior shelf provides a barrier between said band means and the object being clamped; and wherein said body, said exterior shelf and said interior shelf are integrally formed from a single piece of material and each of said interior shelf and exterior shelf has a free edge with said free edge of said interior shelf being located substantially adjacent to an inner surface of at least one of said body and said leg at the end of said lateral extension of said interior shelf and said interior shelf free edge being space both vertically and horizontally from said free edge of said exterior shelf and a gap being defined between said interior shelf and said exterior shelf.

3. A clamping assembly, as claimed in claim 2, wherein:
said body length substantially corresponds to the length of at least one of said interior shelf and said exterior shelf.

4. A clamping assembly, as claimed in claim 2, wherein:
a plurality of locking teeth provided on said second surface of said interior shelf; and
said locking teeth are configured to prevent connection of said band means to said clamping means in a direction along said longitudinal extent of said band means.

5. A clamping assembly, as claimed in claims 1 or 2, wherein:
said band means includes a roll formed band.

6. A clamping assembly, as claimed in claims 1 or 2, wherein:
portions of said clamping means are attached to said band means only by receipt of portions of said band means in a direction substantially perpendicular to said longitudinal extent of said band means.

* * * * *